United States Patent [19]

Turner et al.

[11] Patent Number: 5,553,888
[45] Date of Patent: Sep. 10, 1996

[54] SNAP-ON, REMOVABLE STEERING WHEEL WITH INTEGRAL AIRBAG HOUSING

[75] Inventors: Darin J. Turner, Warren; Daniel G. Zelenak, Lake Orion; John A. Musiol, Southfield, all of Mich.

[73] Assignee: AlliedSignal Inc., Morristown, N.J.

[21] Appl. No.: 495,058

[22] Filed: Jun. 26, 1995

[51] Int. Cl.⁶ ................................................ B60R 21/16
[52] U.S. Cl. ................... 280/731; 74/552; 280/728.2
[58] Field of Search ................... 280/731, 728.2; 74/552

[56] References Cited

U.S. PATENT DOCUMENTS

| | | | |
|---|---|---|---|
| 3,801,123 | 4/1974 | Jira | 280/731 |
| 4,877,264 | 10/1989 | Cuevas | 280/731 |
| 5,228,362 | 7/1993 | Chen et al. | 74/552 |
| 5,342,089 | 8/1994 | Fink et al. | 280/731 |
| 5,398,963 | 3/1995 | Föhl | 280/731 |

*Primary Examiner*—Kenneth R. Rice
*Attorney, Agent, or Firm*—Markell Seitzman

[57] ABSTRACT

A snap-on steering wheel assembly (10) is provided with an integral air bag housing (38) for supporting an air bag (50) therein. The assembly includes a steering wheel having a hub. An inflator (100) is threadably connected to an insert member (60) and longitudinally extends from the hub or insert member. A collar (80) mounted relative the insert provides a snap-fit engagement to a steering column (12).

9 Claims, 1 Drawing Sheet

SNAP-ON, REMOVABLE STEERING WHEEL WITH INTEGRAL AIRBAG HOUSING

BACKGROUND AND SUMMARY OF THE INVENTION

This invention relates to vehicle steering wheels and assemblies, and more particularly to an apparatus for housing an airbag in a vehicle steering wheel.

In prior art steering wheel assemblies, include a steering wheel generally comprise a hub with an aperture therethrough for receiving the steering column shaft, support arms or ribs extend from the hub, and a steering wheel rim with grips for the driver. Typically, the steering column shaft extends through the hub and a nut is placed on the end of the steering column shaft to secure the hub to the shaft. Generally, the end of the shaft and the nut protrude from the hub a certain distance in the direction of the driver of the vehicle. An airbag housing is connected to the hub at a position sufficiently away from the hub to provide clearance for the protruding end of the steering column shaft as well as the nut. This protrusion necessitates moving the airbag housing away from the hub and wastes valuable space in the steering wheel, which makes it difficult to provide a compact design configuration for the steering wheel and airbag module. Also, in prior designs, it was generally necessary to insert a number of attachment screws into the airbag housing from the side of the hub facing the instrument panel after the steering wheel has been attached to the steering column shaft. This attachment can be problematic because it may be awkward to reach behind the steering wheel in order to drive the attachment screws.

It is an object of the present invention to provide a vehicle steering wheel which attaches to the steering column shaft in order to eliminate the clearance requirement for the protruding end of the steering column shaft and nut which typically protrude beyond the hub and necessitate distancing the airbag housing from the hub.

Another object of the invention is to provide a vehicle steering wheel air bag design which is compact.

A further object of the invention is to provide a vehicle steering wheel design which easily attaches to a steering column shaft without the need for a nut.

An additional object of the invention is to incorporate a cylindrical inflator within the steering wheel to provide for a space-saving construction.

Accordingly the invention comprises: a vehicle steering assembly for use with an airbag. The assembly comprises a steering wheel having a hub, a plurality of support arms extending from the hub, and a rim connected to the support arms. An airbag housing is formed integrally with the hub for supporting the airbag. The hub is adapted for mating with a steering column shaft.

This invention further contemplates a steering wheel hub with a central aperture formed therethrough for mating with an insert member which supports a cylindrically shaped airbag inflator. A snap-in locking mechanism cooperates with a collar member, which engages the insert member and the steering column shaft for securing the steering wheel to the steering column.

Many other objects and purposes of the invention will be clear from the following detailed description of the drawings.

DETAILED DESCRIPTION OF THE INVENTION

Figure 1:
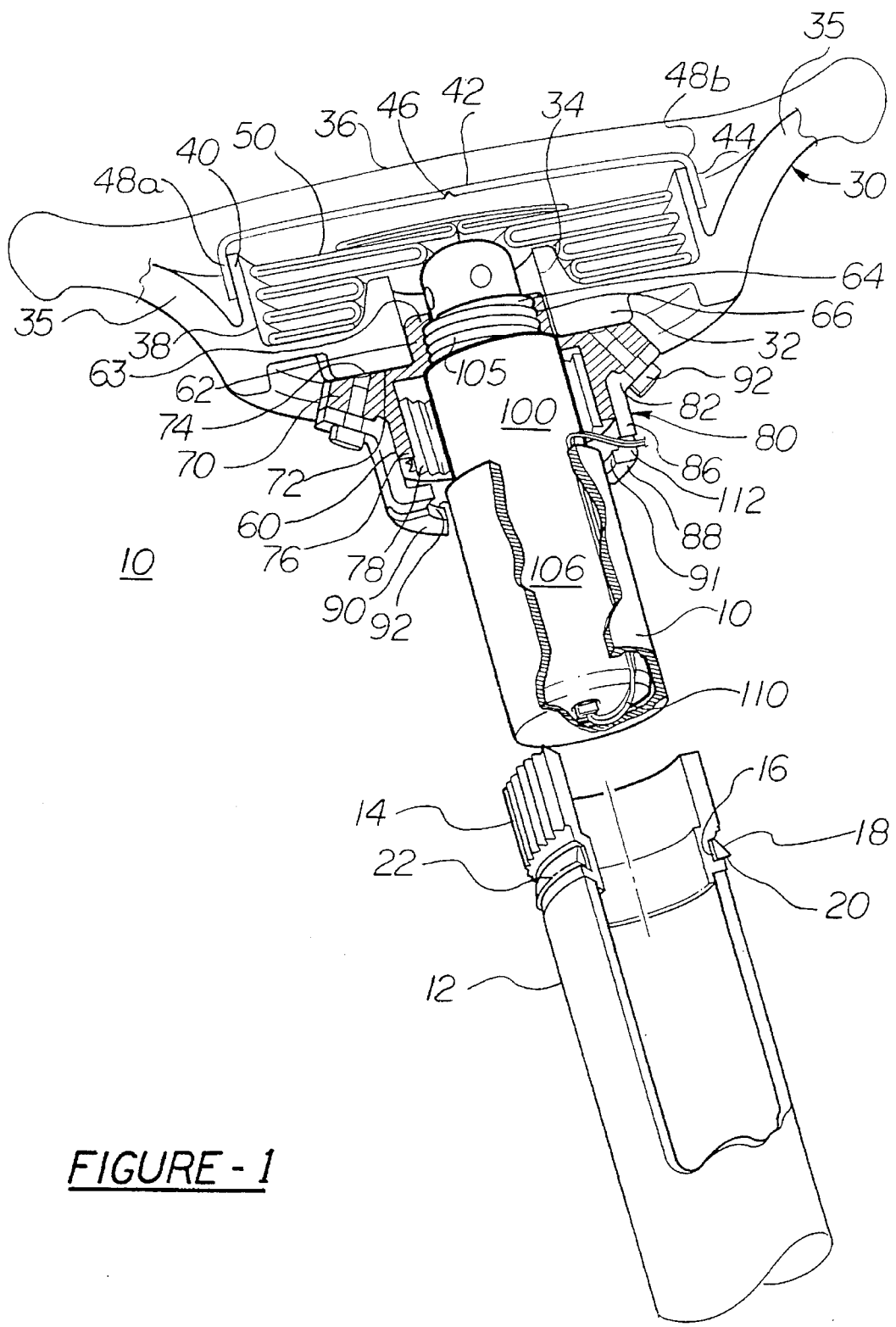
FIG. 1 shows an exploded cut-away side view of a steering wheel assembly in accordance with the present invention.

FIG. 1 shows a partially cut-away exploded view of a steering wheel assembly generally indicated by reference numeral 10.

The steering wheel assembly 10 is adapted to be snap fit onto a hollow steering column shaft 12. The steering column shaft 12 includes splines 14 at its top end and a groove 16. A circular snap or split ring 18 is inserted in the groove 16 and includes a sloped engagement surface 22 and extending flange 20. Split or snap rings such as 18 are circular springs which can be compressed inwardly and then spring outwardly to its unstressed configuration upon removal of the load.

The steering wheel assembly includes a steering wheel 30 having a central hub 32 defining a central opening 34 and a plurality of ribs 35 extend outwardly from the hub 32 to a rim 36.

The steering wheel assembly 10 includes an air bag housing 38 formed integrally with the hub 32. The air bag housing 38 includes side walls 40 upward from the hub 32. A frangible cover 42 having sides 44 is attached to the side walls 40. The cover 42 includes a tear seam 46 of known construction and hinge portion 48a,b. An air bag 50 is stored in a folded condition within the steering wheel beneath the cover 42. Upon inflation of the air bag the cover is torn at its seam and parts of the cover rotate about the hinges 48a,b.

The steering wheel assembly further includes a hollow insert 60 having a hollow, narrow, protruding, center part 62. The insert may be formed integral with the hub or as a separate part. The center part 62 includes a flanged portion 63 defining an inflator receiving center opening 66. The center part also includes a first fastening part such as internal threads 64 or for example a bayonet mount. The insert 60 additionally includes a radially extending flange 70 having a flat first surface 72 matingly engaging a flat second surface 74 of the hub. An axially extending walled portion 76 of the insert 60 includes a plurality of splines 78 which matingly engage the splines of the column 12. As can be seen the diameter across the splines 78 is greater than the inflator receiving opening 66. As can be appreciated other means can be provided to interlock the insert and column splines such as a bayonet mount or a keyed interface.

Positioned below the insert 60 is a collar 80 having a) a first radial portion 82 abutting a corresponding radial part 84 of the insert, b) an axial extending part 86 positioned about the walled portion 76 of the and c) an inwardly extending end cap 88 including an inwardly directed circular flange 90 ending in a blunt edge 91. The circular flange defines an additional opening 92 in which an inflator and sleeve are received. The collar 80 and insert 60 are removably secured to the hub 32 by a plurality of thread fasteners 92 such as bolts.

A pyrotechnic cylindrically shaped inflator 100 is received and supported within the insert 60. As in known inflators for air bags, provide inflation gas by the burning of solid propellant such as sodium azide, or provide heated inflation gas as in the case of a hybrid inflator or gas as a result of combusting burnable fluids. The inflator 100 includes a plurality of gas exits ports 102 situated at an end 104 thereof. The inflator also includes a fastener portion such as threaded portion 105 engagable with the threads 64 or other type of fastener used on the insert 60. The cylindrical lower body 106 extends outwardly from the insert 60 and is protected by a plastic, reinforced plastic sleeve 108. The sleeve 108 is shown is cup shaped metal but can also be an open ended cylinder. As can be seen only the narrow upper part 104 of the inflator 100 extends into the hub advantageously resulting in a small package (cover, air bag and part of the inflator) size. The propellant, inflation gas or liquid is typically stored in the body 106. The sleeve, in addition to protecting the exterior of the inflator 100, also protects the ignition wires 110. As is known the ignition wires serve to communicate an electric signal to activate the inflator. In the embodiment shown the wires extend upwardly between the sleeve and the body of the inflator and exit through an opening 112 in the axial part 86 of the collar.

One advantage of the present invention is that during assembly the air bag 50 and cover 42 may be attached to the steering wheel 30 independent of the inflator 100. The inflator 100 may if desired be installed during the last phases of assembly. The air bag is attached to its housing or to the hub and folded in compact configuration. Thereafter the cover 42 is attached to the air bag housing 38 by fasteners or other known means. The inflator is threaded into the insert 60 and the collar 80 is slid over the inflator body and the insert 60. If the insert is a separate part from the hub, the insert and inflator are fitted into the center opening 34 of the hub 32. The clearance between the insert and the hub can be one of a press fit, interference fit or a loose fit. Thereafter the collar 80 is positioned about the insert 60. The fasteners 92 are received within openings in the collar and insert and received within a threaded tapped holes in the hub and secure the collar, insert and inflator to the steering wheel completing the assembly of the steering wheel assembly.

Thereafter the steering wheel assembly is attached to the steering column 12. This is accomplished by inserting the extending portion of the body 106 of the inflator into the hollow body of the steering column and aligning the splines 78 of the insert and the splines 14 of the column. As the steering wheel assembly is pushed down upon the column the flange 90 engages and compresses the sloped surface 22 of the snap ring 18. Further movement of the steering wheel pushes the slit ring into the groove 16 permitting the flange 90 to slide passed the ring 18. Once the end cap 88 of the collar is positioned below the split ring 18 the ring expands locking the steering wheel in place.

After assembly, if the steering wheel or inflator need to be removed from the column this can be accomplished without having to compress the split ring. As can be appreciated from the above, the steering wheel can be removed simply by removing the fasteners 93 and lifting the steering wheel upwardly away from the collar. To reinstall the steering wheel and inflator the process is reversed.

Many changes and modifications in the above described embodiment of the invention can, of course, be carried out without departing from the scope thereof. Accordingly, that scope is intended to be limited only by the scope of the appended claims.

We claim:

1. An assembly (10) comprising:
   a steering wheel (30) including a hub (32), the hub including a center opening (34), an insert member (60) adjacent the hub including a first fastening portion (64) thereon, an inflator (100), detachably mounted to the insert member including a second fastening portion engagable with the first fastening portion, a collar member (80) engagable with the insert for detachable securing the steering wheel to a column (12), the collar including a first locking part.

2. The apparatus as defined in claim 1 wherein, the insert includes an extending portion (63) received within the center opening (34) and a radial portion (70) engagable with a radial portion (74) of the hub.

3. The apparatus as defined in claim 2 wherein the extending portion includes the first fastening portion which includes threads and an inflator receiving opening (63) and wherein the inflator (100) extends through the inflator receiving opening of the insert member and includes a plurality of exit ports (102) positioned above the inflator receiving opening.

4. The vehicle steering assembly of claim 1, further comprises an air bag (50) mounted in a folded condition about and in communication with the inflator exit ports and secured to the steering wheel and wherein a cover is mounted to the steering wheel.

5. The apparatus as defined in claim 1 wherein the inflator includes an axially extending body portion and where a sleeve is received about the extending portion of the inflator for protecting wires exiting the inflator.

6. The apparatus as defined in claim 5 wherein the sleeve is cup-shaped and covers a bottom portion of the body portion.

7. The apparatus as defined in claim 1 for use in combination with a steering column shaft (12), and a second locking part defining in combination with the first locking part a snap-on locking mechanism for securing the hub to the steering column shaft as the steering wheel is mated with the steering column shaft.

8. The apparatus as defined in claim 1 wherein the insert member and the steering wheel are of integral construction.

9. The apparatus as defined in claim 3 in which the inflator is cylindrically shaped and includes a body portion extending axially downward from the insert beyond the collar.

* * * * *